Sept. 11, 1962   F. STEINER ETAL   3,054,105
RADIO DIRECTION FINDING SYSTEM
Filed May 27, 1957   3 Sheets-Sheet 2
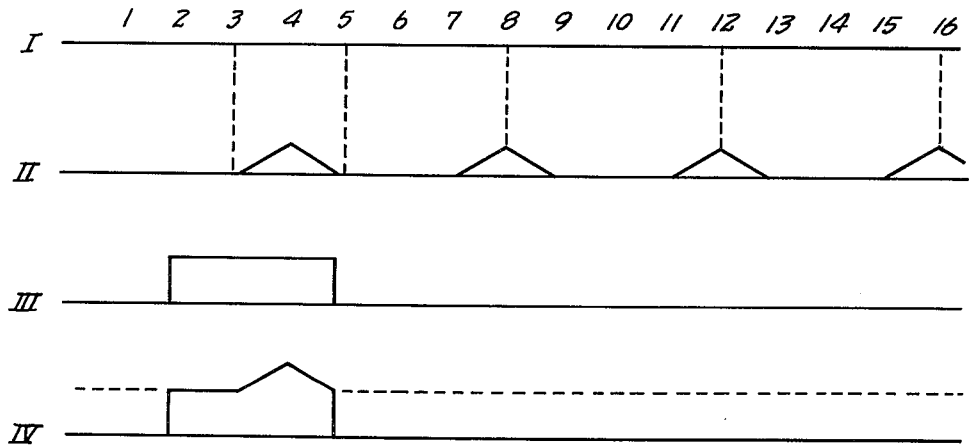
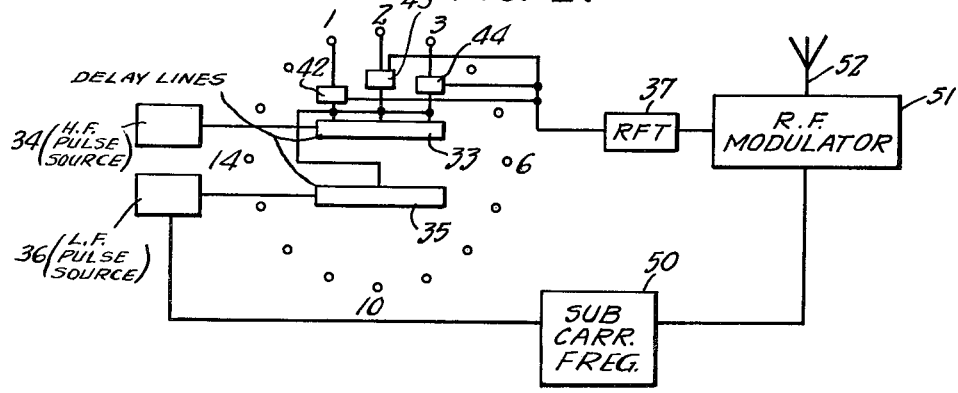
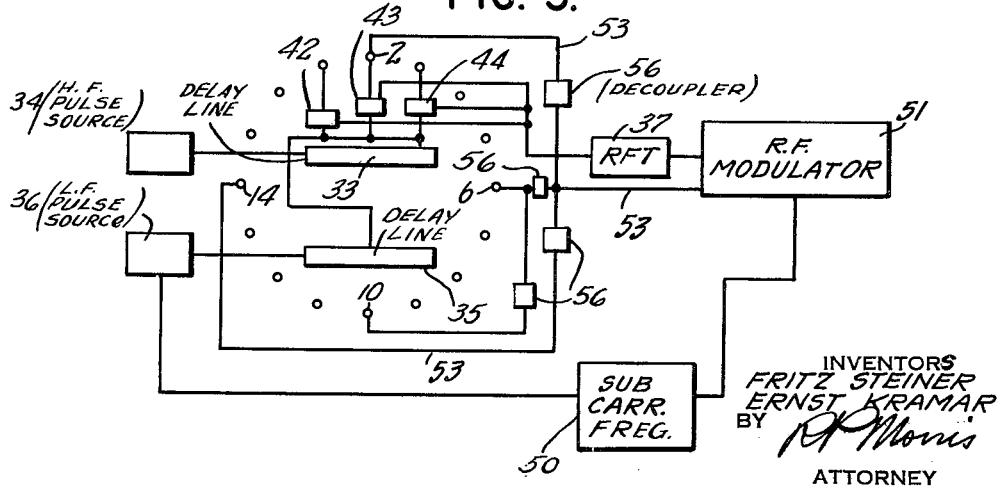
INVENTORS
FRITZ STEINER
ERNST KRAMAR
BY
ATTORNEY

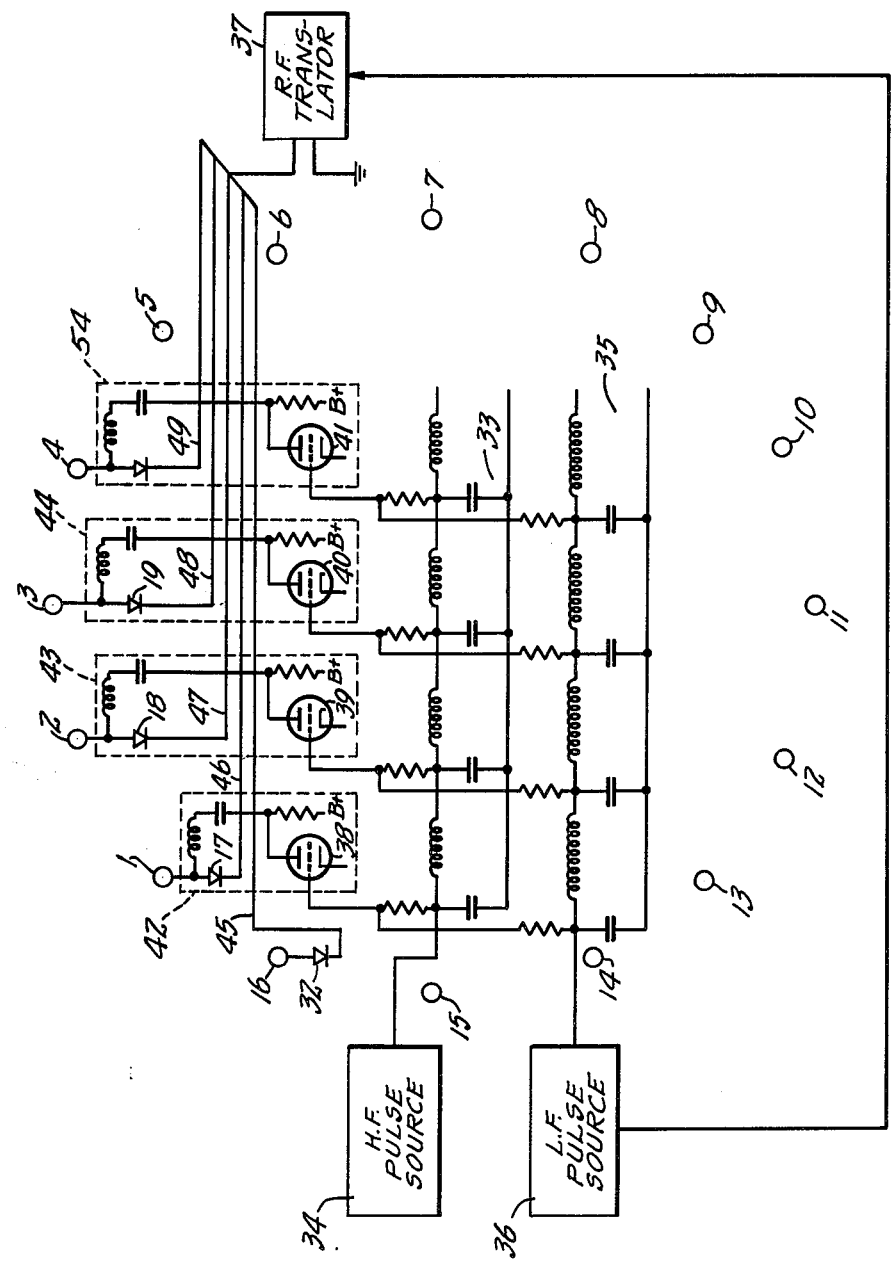

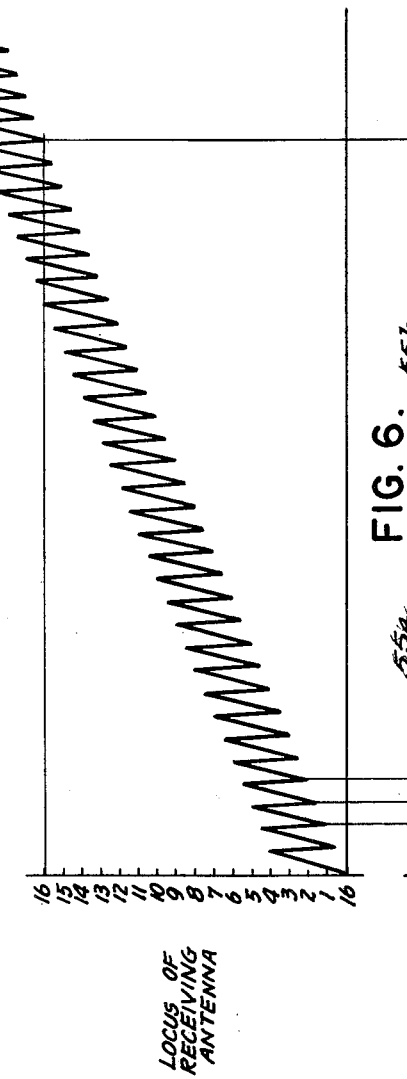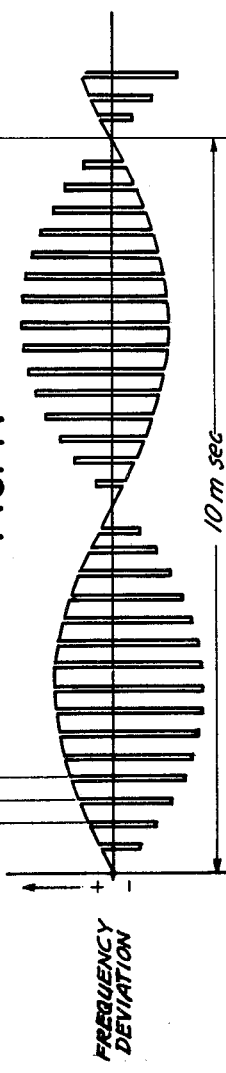

3,054,105
RADIO DIRECTION FINDING SYSTEM
Fritz Steiner and Ernst Kramar, Pforzheim, Germany, assignors to International Standard Electric Corporation, New York, N.Y., a corporation of Delaware
Filed May 27, 1957, Ser. No. 661,758
Claims priority, application Germany June 2, 1956
10 Claims. (Cl. 343—113)

In a radio direction finding system of known prior art, bearing information can be obtained by means of a phase modulation of the incoming high-frequency energy. This phase modulation, for example, can be achieved by moving a receiving antenna mechanically along a circular path. Various embodiments of this type have already been proposed. At the points of contact of the tangents to this circle extending towards the direction of incidence of the wave there will be a maximum of phase modulation, while phase modulation will disappear in the direction extending perpendicularly in relation to the direction of incidence.

Instead of making a single antenna to rotate around the circumference of a circle, it is also possible to use a number of antennas arranged along the periphery of a circle which by the action of suitable switching means, are connected in a cyclic succession to the receiver input.

In the first mentioned case the speed of rotation is limited for mechanical reasons, but by using electrical rotation in the latter case the speed can be effected with a frequency chosen at will. The evaluation at the receiver output can be performed, for example, by means of a conventional frequency discriminator. However, in order to obtain a high degree of frequency deviation, a sufficiently high frequency of rotation is required. As is well known, the frequency modulation is the result of a differentiation of the phase modulation. However, in the case of such high frequencies of rotation some errors in azimuth measurement which depend on the tuning will occur in the receiver, due to the non-constant transient response.

It has been proposed to employ a phase discriminator in which the phase of the phase-modulated high-frequency voltage, derived from an antenna rotating at a correspondingly slow rate, is compared with the voltage from a fixed subsidiary antenna by means of a second receiver, instead of a frequency discriminator, to avoid these errors. This, however, represents a substantial additional investment. Furthermore, the employment of this method at the transmitting station is impossible, because the phase-modulated voltage cannot be separated from the non-modulated reference voltage.

The aforementioned disadvantages can be avoided by means of scanning a circular antenna array in a cyclic succession in a special manner according to the invention. According to the invention there is used such a high scanning frequency that there will result a frequency deviation which is sufficiently high for the evaluation in a normal frequency discriminator, and the high frequency scanning voltage is superimposed by a second voltage of such a low frequency that the transient response in the receiver due to the scanning voltage will become negligibly small.

The system may be described as an arrangement for producing a radiation pattern effectively moved preferably rotating, at a predetermined rate and effectively modulated at a multiple of this predetermined rate which consists of an array of antennas, preferably a circular array, coupled to a translator through individual coupling means so that antennas in a group of the multiple antenna array are successively coupled to the translator at a rate corresponding to the multiple of the predetermined rate and the group of antennas is effectively moved along the array of antennas at the predetermined rate.

The above-mentioned and other features and objects of this invention and the manner of attaining them will become more apparent and the invention itself will be best understood by reference to the following description of an embodiment of the invention taken in conjunction with the accompanying drawings, in which:

FIG. 1 is a schematic diagram illustrating an embodiment of this invention.

FIGS. 2 and 3 are block schematic diagrams showing the adaptation of a system in accordance with FIG. 1 for radio beacon transmission.

FIG. 4 is a diagram illustrating the operation of the pulses as applied in the system of FIG. 1, and FIGS. 5, 6 and 7 are curves used in explaining the operation of the system.

In FIG. 1 there is shown an example of an embodiment of the invention as applied to a direction finder. Around the circumference of a circle there is arranged a number of antennas 1–16 of which only 1–4 are referred to in detail. It be assumed that, for example, the diodes designated by 17–32 are provided as switching means, or switching elements. To these diodes, via the interconnected electron tubes 38—41 are fed the successive switching pulses. The diode and electron tube circuits form electron gates indicated generally at 42—44 and 54. The diodes are normally non-conducting because of the initial bias applied from the R.F. translator 37. The switching pulses render them conductive so that a transfer of energy between the antennas and the translator can take place. Switching pulses are taken from a delay line 33. To the input of this delay line there are applied pulses at a high recurrence frequency, which are produced by a pulse generator 34. The succession of pulses is so chosen that the following pulse will be fed to the input of the retardation or delay line after the preceding pulse has, for example, travelled over one quarter of the circumference of the circular group arrangement, so that four pulses are rotating simultaneously.

The time delay of retardation line 33 is so chosen that a pulse travels the way from the first to the last antenna within about 100 μsec. The pulse voltages from the retardation line 33, and second pulse potentials which, from a pulse source 36, operating at a low recurrence frequency produced by a delay line 35, are fed to the control grids of each of the coincidence gating tubes 38—41. The time-delay of the retardation line 35, however, may be of such a value that the pulses traverse around the array in 10 milliseconds. The pulses from source 36 are preferably rectangular and the pulse width should be so chosen that a quarter of all switching tubes are simultaneously biased by these second pulse potentials so that they can be switched on and off by the first pulse of a high repetition rate.

The separate antennas 1–16 are coupled to a common radio frequency translator 37, by lines such as 45—49. Preferably these lines are of equal length so that no additional phase shift is introduced. It will be seen that at the translator the energy will appear as if one antenna is rotated about the circumference of the array at a speed of 10 milliseconds, and simultaneously oscillated through a quarter of the circle at a speed corresponding to a complete rotation in 100 μs. As a consequence, the wave input at the translator will have a complex phase modulation, dependent upon the direction of incidence of the received wave on the antenna array. The output of a frequency discriminator at the translator operating to detect the high frequency pulses, will thus be an envelope wave varying in amplitude at the frequency of the low frequency pulses. The phase of this envelope wave with respect to the low frequency pulse source will provide an indication of direction.

It will be apparent that the effective complex rotation of the antenna radiation pattern may be also used to provide a radio beacon. In this instance the translator 37, is a source of radio frequency energy instead of a receiver. Also a source of reference signals is modulated and transmitted at a low frequency pulse rate.

Thus in FIG. 2 there is illustrated an array coupled to units similar to those of FIG. 1. However, the output from the low frequency pulse generator 36 is used to modulate a sub carrier at 50, which in turn is used to modulate the radio frequency energy from the transmitter 37 and radiated from antenna 52 via R.F. modulator 51. Thus the low frequency pulses are transmitted as a reference signal from which the envelope of the energy received from the array can be compared to determine direction.

FIG. 3 illustrates another form of transmitter substantially similar to FIG. 2 except that instead of using a separate reference frequency transmitter antenna 52 the output of modulator 51 is coupled in equal phase to all of the radiators 1–16 of the array via decouplers 56 along lines 53 which, for purposes of clarity, are only shown connected to radiators 2, 6, 10 and 14. These decouplers permit energy to flow from modulator 51 to the various radiators via lines 53 and prevent flow of energy from the radiators back through lines 53 to modulate the other radiators.

Turning now to FIG. 4, the line of curve I illustrates the relative position of the antenna radiators 1–16 developed into the linear array. The curve II illustrates four pulses from the high frequency pulse source 34 at a given position along the antenna array. Thus pulses are effectively being coupled at the instant shown to antennas 4, 8, 12 and 16 of the array. Curve II then represents the pulses from low frequency pulse source 36. It will be noted that only one pulse is present at the time that the four pulses from the high frequency source are present. This pulse is preferably substantially rectangular and of sufficient length to bridge four antenna units. At the coincidence tubes 38—41 there will then effectively appear a composite pulse such as shown in the curve IV. The various coincidence tubes 38—41 are so biassed that they will only respond to the energy above the dotted line in curve IV.

A better understanding of the operation of the system may be had by reference to the curves shown in FIGS. 5, 6 and 7. In each of these curves the abscissa represents time. In curve, FIG. 5, the antenna units of the array are indicated on the ordinate axis at 1–16. The effective deviation or movement of the antenna array for the coordinate aray is shown by the curve. It will thus be seen that first there is a deviation for antennas 1–4, next for antennas 2–5, etc. throughout the array. When the antennas are arranged in a circular array the deviation will be in one direction half way round the array and the deviation will then be in a different direction during the other half of the effective rotation. This will be clear when it is seen that during one half of the rotation the rotation is effectively moving away from the receiving point whereas during the other half of the rotation it is moving toward it. Thus the phase deviation for a complete rotation will appear somewhat like the pattern shown in FIG. 6 where phase deviation is the ordinate. It will be noted that the gradual changing slope 55B of the wave is different for the second half of this pattern than the first half of the gradual changing slope 55A, due to the assumption that the reception is made around the circular array. It will be seen that there is present a substantially sinusoidal envelope of a wave modulated in phase throughout its duration.

The curve of FIG. 7 illustrates the effective envelope pattern as an amplitude variable wave dependent upon the effective frequency deviation caused by the high frequency phase shift. Thus the output of a frequency discriminator will follow substantially the sine wave envelope pattern illustrated in this FIG. 7.

It will be clear that while the invention has been described in connection with a circular array in which it is believed the widest application of this invention would be applied, the principles of the invention are not limited thereto but would work to provide substantially the same effect regardless of the shape of the array.

While the principles of this invention have been described in connection with specific apparatus, it is to be clearly understood that this description is made only by way of example and not as a limitation to the scope of the invention as set forth in the objects thereof and in the accompanying claims.

What is claimed is:

1. A system for producing a radiation pattern effectively shifting at a predetermined rate and effectively frequency modulated at a frequency which is a multiple of said predetermined rate, comprising an array of a plurality of antennas, a translator, means for successively coupling the antennas of a group of successive groups of said antennas to said translator at a rate corresponding to a frequency which is a multiple of said predetermined rate, each of said successive groups of antennas including at least one antenna of a group previous to said group, the rate of coupling said successive groups of antennas corresponding to said predetermined rate whereby effective shifting of said groups of said antennas along said array is accomplished.

2. A system for producing a radiation pattern effectively rotating at a predetermined rate and effectively frequency modulated at a frequency which is a multiple of said predetermined rate, comprising a circular array of a plurality of antennas, a translator, means for successively coupling the antennas of a group of successive groups of said antennas to said translator at a rate corresponding to a frequency which is a multiple of said predetermined rate, each of said successive groups of antennas including at least one antenna of a group previous to said group, the rate of coupling said successive groups of antennas corresponding to said predetermined rate whereby effective shifting of said groups of said antennas along said array is accomplished.

3. A system according to claim 2, wherein said translator is a radio receiver, having a frequency discriminator for deriving the envelope frequency corresponding to the phase shift produced by said means for successively coupling said antennas and groups of antennas to said translator.

4. A system according to claim 2, wherein said translator is a radio transmitter.

5. A system according to claim 2, wherein said means for coupling comprises gating circuits coupled to each antenna of said array, a first series of pulses applied to said gate circuits at a rate corresponding to a frequency which is a multiple of said predetermined rate, and a second series of pulses applied simultaneously to the gate circuits included in a group.

6. A system according to claim 5, wherein said means for coupling successive antennas comprises a delay line for said second series of pulses, and means coupling said antennas to said delay line at successively spaced points therealong.

7. A system for producing effective complex movement of a radio antenna for directive purposes, comprising an array of antenna units divisible into groups, gating means for each antenna of said array, operative in response to simultaneous application of first and second gating signals, a radio translator coupled to said antennas through said gating means, a first gating source for applying a first gating signal simultaneously to a group of said antennas, means for progressively applying said signal to successive of said groups at a predetermined rate, and a second gating source for successively applying a second gating signal to said gates during the period of application of each of said first and second gating signals at a multiple of said predetermined rate, whereby there is produced an effective movement of said groups along said array at said predetermined rate, and an effective movement of an antenna in each successive group at said multiple rate.

8. A system for producing effective complex rotary movement of a radio antenna for directive purposes, comprising a circular array of antenna units divisible into groups, gating means for each antenna of said array operative in response to simultaneous application of first and second gating signals, a radio translator coupled to said antennas through said gating means, a first gating source for applying a first gating signal simultaneously to a group of said antennas, means for progressively applying said signal to successive groups at a predetermined rate and a second gating source for successively applying a second gating signal to said gates during the period of application of said first gating signal at a multiple of said predetermined rate, whereby there is produced an effective rotation of said groups about said array at said predetermined rate, and an effective rotary movement of an antenna in each successive group at said multiple rate.

9. A system according to claim 8, wherein said translator is a radio receiver having a frequency discriminator to derive an envelope wave corresponding to said effective rotation, further comprising means for applying said second gating signal to said translator for comparison with said derived envelope wave.

10. A system according to claim 8, wherein said translator is a transmitter, further comprising means for radiating a reference signal corresponding to said second gating signal.

References Cited in the file of this patent

UNITED STATES PATENTS

| | | |
|---|---|---|
| 2,411,518 | Busignies | Nov. 26, 1946 |
| 2,444,425 | Busignies | July 6, 1948 |
| 2,481,509 | Hansel | Sept. 13, 1949 |
| 2,502,131 | Earp | Mar. 28, 1950 |
| 2,568,768 | Selz | Sept. 25, 1951 |